(12) United States Patent
Ries-Mueller et al.

(10) Patent No.: US 7,134,414 B2
(45) Date of Patent: Nov. 14, 2006

(54) METHOD AND DEVICE FOR STARTING AN INTERNAL COMBUSTION ENGINE

(75) Inventors: Klaus Ries-Mueller, Bad Rappenau (DE); Uwe Kassner, Moeglingen (DE); Udo Sieber, Bietigheim (DE); David Moessner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/773,536

(22) Filed: Feb. 5, 2004

(65) Prior Publication Data

US 2004/0221828 A1  Nov. 11, 2004

(30) Foreign Application Priority Data

Feb. 10, 2003  (DE) ................... 103 05 324
Dec. 17, 2003  (DE) ................... 103 59 168

(51) Int. Cl.
*F02N 11/08* (2006.01)

(52) U.S. Cl. .................................. 123/179.3

(58) Field of Classification Search ............. 123/179.3, 123/179.4
See application file for complete search history.

(56) References Cited

U.S. PATENT DOCUMENTS

| 4,286,683 A | * | 9/1981 | Zeigner et al. | ........... 123/179.4 |
| 6,286,470 B1 | * | 9/2001 | Riksen et al. | ............ 123/179.3 |
| 2004/0200448 A1 | * | 10/2004 | Kojima et al. | ........... 123/179.3 |

FOREIGN PATENT DOCUMENTS

| DE | 196 45 943 | 5/1998 |
| DE | 197 43 492 | 4/1999 |
| JP | 2002-4985 A * | 1/2002 |

* cited by examiner

*Primary Examiner*—Andrew M. Dolinar
(74) *Attorney, Agent, or Firm*—Kenyon & Kenyon LLP (57) ABSTRACT

A method and a device for starting an engine system, especially of a vehicle, which make possible a start of the engine system that is as quick and comfortable as possible. In this context, it is tested for a start request whether a starter-free starting method leads to a successful start of the engine system. For the case in which the test result is negative, the engine system is started automatically using a starter.

22 Claims, 7 Drawing Sheets

METHOD AND DEVICE FOR STARTING AN INTERNAL COMBUSTION ENGINE

FIELD OF THE INVENTION

The present invention relates a method and a device for starting an internal combustion engine.

BACKGROUND INFORMATION

German Patent Application No. DE 196 45 943 describes a starter unit for an internal combustion engine. It permits two different starting methods. One starting is a pulse start and the other is a direct start. Both starting methods are starter-free starting methods. In this context, the pulse start is preferably carried out on a cold engine using the energy of a flywheel, and the direct start gets to be used on a hot engine, for instance at traffic light stops. In this context, the most favorable starting method is respectively selected autonomously as a function of the temperature of the internal combustion engine.

German Patent Application No. DE 197 43 492 describes a method for starting an internal combustion engine, especially of a motor vehicle. The internal combustion engine is furnished with a piston, moving in a cylinder, which is able to run through an intake phase, a compression phase, a working (expansion) phase and an exhaust phase. In addition, a control unit is provided, by which the fuel is able to be injected directly into a combustion chamber bounded by the cylinder and the piston, either in a first operating type during a compression phase or in a second operating type during an intake phase. The control unit is designed in such a way that, for starting, the fuel is injectable, in a first injection, into that combustion chamber whose appertaining piston is currently in the working phase.

SUMMARY

A method and device according to the present invention may have the advantage that, for a start request, a test is made as to whether the starter-free starting method leads to a successful start of the internal combustion engine, and, in the case in which the test result is negative, the internal combustion engine is started automatically with the aid of a starter. In this manner it is ensured that the start request can be converted even if the starter-free starting method is not successful, without a user's intervention being required. Consequently, even in the case of not being able to carry out, or the failure of, the starter-free starting method, which is relatively rapid in comparison to a starter start, may still ensure a conversion of the start request, without further action of the user, while using the starter. Consequently, a fast and comfortable start of the internal combustion engine may be implemented under all operating conditions of the internal combustion engine.

It may be particularly advantageous if the testing for a successful start is conducted with the aid of the starter-free starting method by evaluating a temperature of the internal combustion engine, preferably an oil temperature. In this way, in having the temperature of the internal combustion engine, there is a reliable criterion, in the light of which it may be determined even before the start whether the starter-free starting method will lead to a successful start of the internal combustion engine, so that, when there is a negative test result, the starter start can immediately be used, and consequently no time is lost for an unsuccessful, starter-free start.

Another advantage may come about if the testing for a successful start is conducted with the aid of the starter-free starting method by evaluating a rotary speed of the internal combustion engine, preferably an oil temperature. In this way, in response to selecting the starter-free start, it may be recognized already in an earlier starting phase whether the starter-free start is successful, and consequently, when the test result is negative, one may automatically switch over to the starter start, so that the time loss, effected by the starter-free start that was begun, is minimal.

In addition, in this way, in the case in which a renewed start request is detected, after shutting down (switching off) the internal combustion engine but still during the running down of the internal combustion engine, rapid and comfortable restarting of the internal combustion engine may be carried out under all operating conditions of the internal combustion engine, especially at all possible rotary speeds during the slowing down of the internal combustion engine.

Another advantage may come about if the testing for a successful start is conducted with the aid of the starter-free starting method by evaluating a position of the crankshaft of the internal combustion engine. In this way, as also in the case of the evaluation of the temperature of the internal combustion engine, a criterion is given which makes possible, even before beginning the starter-free start, an estimation of the prospect of success of the starter-free start, and consequently, if there is a negative test result, the starter start can immediately be selected without a loss of time.

It may be particularly advantageous if, as a starter-free starting method a direct starting method is selected in which the starting is done directly, using a direct injection of gasoline. In this manner, the vehicle electrical system is not loaded in response to the direct starting method.

In the case of initiating the starter-free starting method, it may be particularly advantageous if testing is done to see whether this starter-free start is successful, and that, upon failure of the starter-free start, the internal combustion engine is started again automatically with the aid of the starter. In this way, it may be ensured, even after a starter-free start has already been initiated and has failed, that the internal combustion engine can be started with the aid of the starter without further action by the user. This raises the comfort level for the user and prevents the loss of time that would come about based upon a starting operation by the user.

Still another advantage may come about if, upon the failure or an initiated starter start, the internal combustion engine is started again automatically with the aid of the starter-free starting method. In this way, even upon failure of the starter start, using the starter-free starting method, an additional starting attempt is available which can be initiated without any action of the user, and consequently prevents time loss and raises operating convenience.

An additional advantage may come about if the start request is detected upon activation of an operating element, preferably an accelerator, when the internal combustion engine is already shut down. In this manner, a start-stop operation of the internal combustion engine may be implemented, without, for example, an ignition key having to be additionally operated for the start of the internal combustion engine. This increases the level of comfort of operating the internal combustion engine, and lessens its time loss.

Furthermore, it is advantageous that, in the case of a start request after shutting down the internal combustion engine, it is tested whether the rotary speed of the internal combustion engine lies in a first specified range, and that, in this case, the internal combustion engine is started in a starter-free manner. In this way, the internal combustion engine may be started again as fast and as comfortably possible if, after shutting down the internal combustion engine, but still during slowing down of the internal combustion engine, a renewed start request is detected.

Yet another advantage may be derived if, at a rotary speed of the internal combustion engine in a second specified range, which lies below the first specified range, the internal combustion engine is started by the immediate intervention of the starter. In this way, in the case in which, after shutting down of the internal combustion engine, but still during the running down of the internal combustion engine, however, at lower rotary speed, a renewed start request is detected, the internal combustion engine may be started again as quickly as possible, even using a greater effort, based on starter intervention.

Yet another advantage is derived if, at a rotary speed of the internal combustion engine in a third range, which lies below the second specified range, the internal combustion engine is started by the intervention of the starter, after the running down of the internal combustion engine. In this way, in the case in which a renewed start request is detected, after shutting down the internal combustion engine, but still during the running down of the internal combustion engine, however, at a rotary speed that is too low for an immediate starter start, the usual starter start from rotary speed zero is carried out.

BRIEF DESCRIPTION OF THE DRAWINGS

Example embodiments of the present invention are shown in the drawings and explained in detail in the following description.

DETAILED DESCRIPTION OF EXAMPLE EMBODIMENTS

Figure 1:
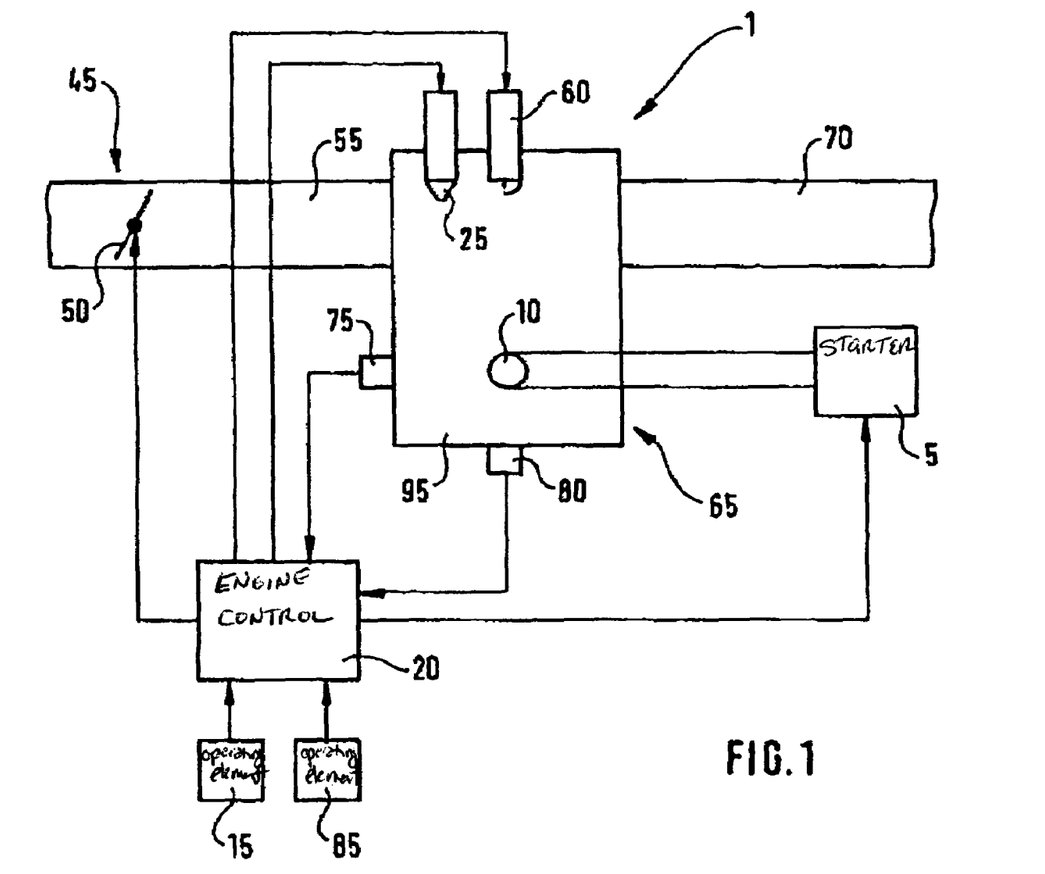
FIG. 1 shows a schematic view of an internal combustion engine according to a first example embodiment of the present invention.

In FIG. 1, reference numeral 1 designates an internal combustion engine of a motor vehicle, for example. Internal combustion engine system 1 includes an internal combustion engine 65 which, for example, may be an Otto engine or a Diesel engine. In the following, it is assumed by way of example that internal combustion engine 65 is developed as an Otto engine.

Internal combustion engine 65 is supplied with fresh air via an air supply 45. The magnitude of the air mass flow may be adjusted via a throttle valve 50 in air supply 45. The range of air supply 45 which lies between throttle valve 50 and internal combustion engine 65 is also designated as intake manifold 55.

Fuel is injected directly into a combustion chamber of a cylinder 95 of internal combustion engine 65 by a fuel injector 25. In this context, internal combustion engine 65 is able to include one or several cylinders. The air/fuel mixture present in the combustion chamber of cylinder 95 is ignited by a spark plug 60. This leads to the drive of a piston of cylinder 95, which, in turn, drives a crankshaft 10 of internal combustion engine 65. The burnt exhaust gas is carried away from internal combustion engine 65 via an exhaust branch 70.

A crank angle sensor 75 is situated on internal combustion engine 65, which records the position of crank angle 10 and transmits it to an engine control 20. In addition, or alternatively, a temperature sensor 80 is situated on internal combustion engine 65, which measures the temperature of internal combustion engine 65 and also transmits it to engine control 20. In this context, temperature sensor 80 is able to measure an oil temperature of the engine oil used in internal combustion engine 65. Alternatively, the temperature of the intake air could also be measured by a temperature sensor in air supply 45, or the cooling water temperature could likewise be measured by a suitable temperature sensor in the region of the cooling water.

A first operating element 15 is provided which may, for example, be an accelerator. First operating element 15 is also connected to engine control 20. Optionally, a second operating element 85 may be provided, which, for example, may be a brake pedal, and may also be connected to engine control 20. As a function of the degree of operating of first operating element 15, engine control 20 is able to ascertain an operator-desired torque, in a conventional manner. The operator-desired torque is converted by engine control 20 by the manipulated variables air mass flow, injection quantity and ignition point. For this purpose, engine control 20 activates throttle valve 50 to set the required air mass flow. Engine control 20 also controls fuel injector 25 so as to set the required fuel quantity to be injected, such as by specifying an injection starting time and an injection period. Furthermore, engine control 20 activates spark plug 60 for setting a suitable ignition point. The conversion of the operator-desired torque via the manipulated variables named takes place, in this context, in a conventional manner. A starter 5 is also provided, which brings crankshaft 10 to a specified rotary speed, when engine system 1 is started. Starter 5 may be designed, in this context, as a conventional electrical starter as described in German Patent Application No. DE 196 45 943, and fed by a vehicle electric system not shown in FIG. 1. In this context, starter 5 is activated by engine control 20. Engine control 20 activates starter 5 to start engine system 1 from a standstill, if there is a corresponding start request on the part of the operator, such as by turning the ignition key.

Figure 2:
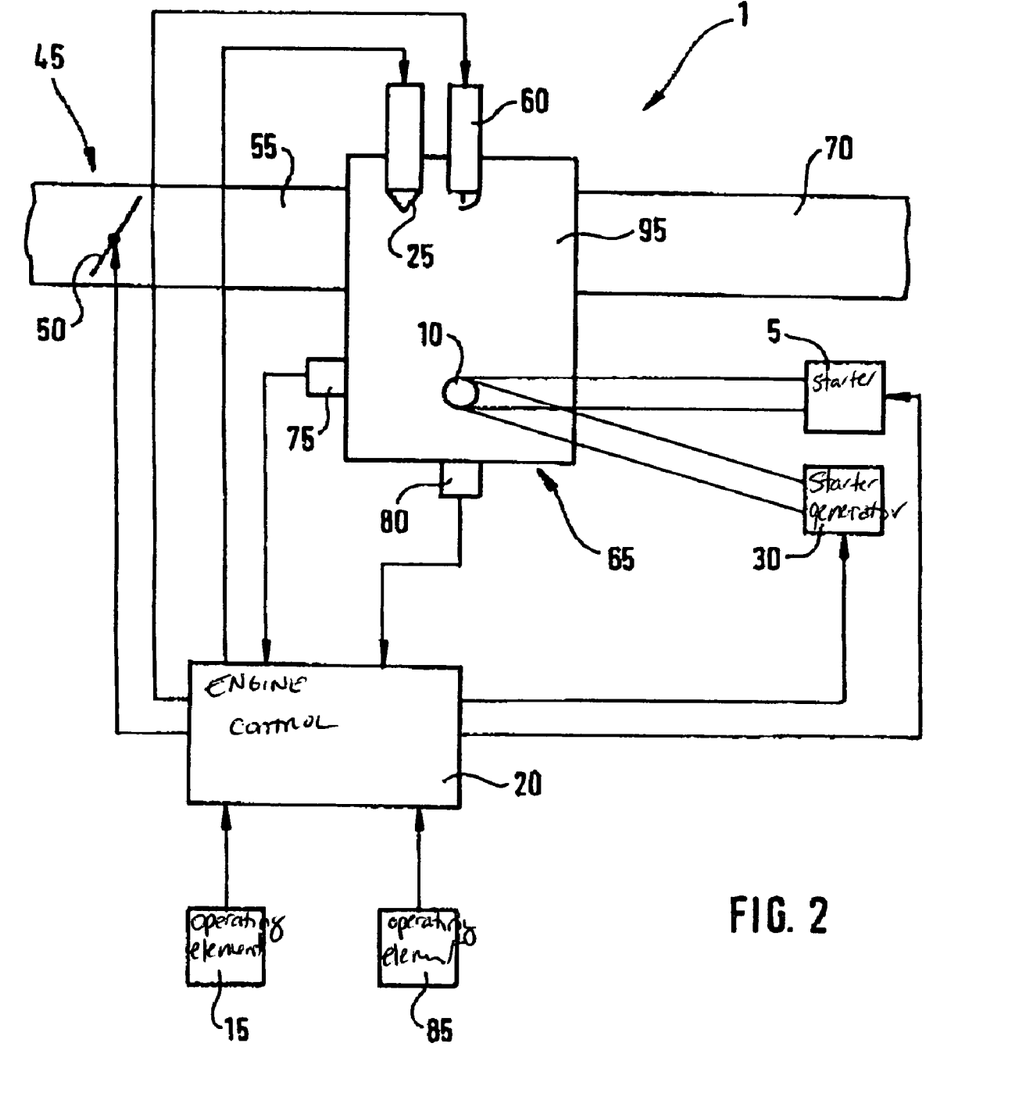
FIG. 2 shows a schematic view of an internal combustion engine according to a second example embodiment.

A second example embodiment of engine system 1 is shown in FIG. 2, the same reference numerals characterizing the same elements as in FIG. 1. By contrast to the first example embodiment as in FIG. 1, in the second example embodiment as in FIG. 2 a starter generator 30 is additionally provided, which, alternatively to starter 5, is able to drive crankshaft 10 when engine system 1 is started, and bring it up to a specified rotary speed.

In the case where combustion engine 65 is a Diesel engine, spark plug 60 and throttle valve 50 are not provided, in either example embodiment. The conversion of the operator-desired torque is implemented, in this case, only by setting the fuel injection quantity.

However, in the following, it is assumed by way of example that combustion engine 65 is developed as an Otto engine of a motor vehicle. The operator-desired torque is consequently a driver-desired torque. First operating element 15, for instance, is an accelerator, and second operating element 85 is, for instance, is a brake pedal.

According to German Patent Application No. DE 196 45 943, starter generator 30 may be designed as a starter generator/direct start or for a pulse start. In this context, starter generator 30 may also be switchable between starter generator/direct start and pulse start, as described in German Patent Application No. DE 196 45 943. Starter 5 and starter generator 30 according to FIGS. 1 and 2 may be provided, for example, as described in DE 196 45 943.

In addition, in the exemplary embodiments described here according to FIGS. 1 and 2, a direct start may also be carried out with the aid of direct gasoline injection, as described in exemplary form in German Patent Application No. DE 197 43 492.

The start-stop operation of a motor vehicle is an effective measure for the reduction of fuel consumption. In this context, combustion engine 65 is shut down automatically at stillstand, for example, during a stop at a traffic light. When combustion engine 65 is shut down, if the driver operates accelerator 15 again, combustion engine 65 starts. Start-stop operation is especially advantageous and comfortable if the direct start takes place with the aid of direct gasoline injection. In this context, combustion engine 65 is started at low noise, extremely fast, without activation of starter 5 and without loading the vehicle electric system One may assume that the direct start using direct gasoline injection does not work well under all necessary operating conditions of combustion engine 65. For example, a high engine temperature above 100° C. is critical, since then only a slight quantity of air or oxygen mass is present in the combustion chamber of cylinder 95. It is then not ensured that the energy that is able to be generated at a first injection is sufficient for the start of combustion engine 65. Even the operation of starter generator 30 for a direct start or an pulse start, as described in German Patent Application No. DE 196 45 943, is not ensured, depending on the temperature. Thus, according to German Patent Application No. DE 196 45 943, the operation of the starter generator using direct start is suitable rather at high temperature, whereas the operation using pulse start is rather suitable at low temperatures.

According to the present invention, it is therefore provided that, in case of a start request, it is tested whether the starter-free starting method leads to a successful start of engine system 1, and that, for the case in which the test result is negative, engine system 1 is started automatically with the aid of starter 5. In these exemplary embodiments, the starter-free starting method is the direct start using direct gasoline injection or the use of starter generator 30. In case the starter-free start of engine system 1 should not be possible or should already have failed, the system switches over to the starter start. In this way, one may achieve a rapid and comfortable engine start under all operating conditions.

Figure 3:
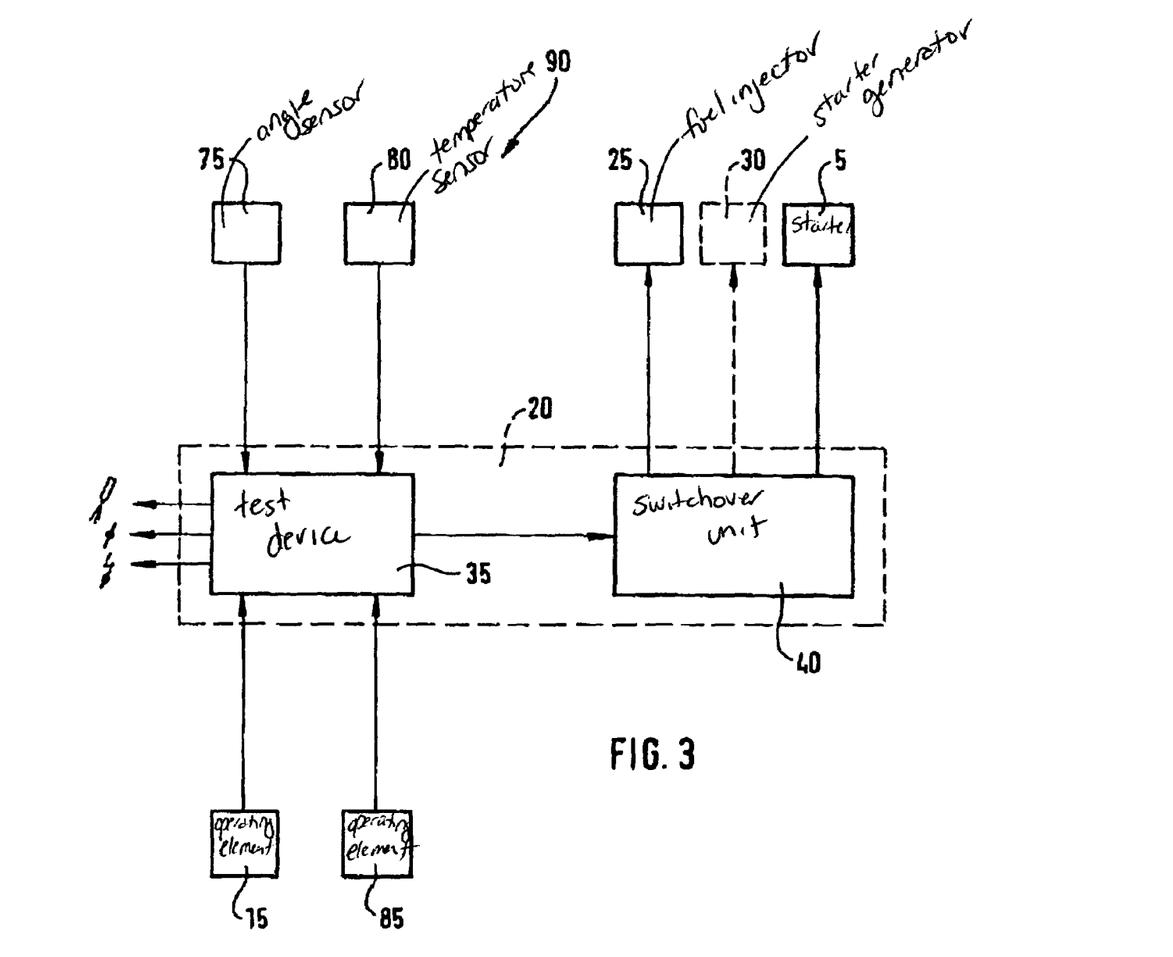
FIG. 3 shows a block diagram of a device according to the present invention.

In order to carry out the method according to the present invention, a device 90 is provided which, according to FIG. 3, includes engine control 20. Furthermore, device 90 includes crank angle sensor 75 and/or temperature sensor 80. Device 90 also includes fuel injector 25 and/or starter generator 30, which is shown in FIG. 3 as a dashed line, as well as starter 5. Engine control 20 includes testing means 35 which are also designated as test unit below, and to which the measuring signals of crank angle sensor 75 and/or the measuring signals of temperature sensor 80 are supplied. In the case of a start request, testing unit 35 tests whether the starter-free start leads to a successful start of engine system 1. The test result is supplied to switchover means 20 which are also designated as switchover unit below, and which, in the case in which the test result is negative, start engine system 1 automatically, using starter 5. If there is a positive test result, switchover unit 40 starts engine system 1 either via fuel injector 25 by direct gasoline injection, or via starter generator 30 in a starter-free manner.

The degree of operation of accelerator 15 is also supplied to test unit 35.

The degree of operation of brake pedal 85 is also supplied to test unit 35.

Test unit 35 may, for example, test in two stages whether the starter-free start leads to a successful start of engine system 1. In the case of shut-down engine system 1, that is, shut-down combustion engine 65, test unit 35 detects a start request for starting engine system 1 when accelerator 15 is operated. In a first stage, test unit 35 then tests, before the actual start, whether the starter-free start will lead to a successful start of engine system 1. If this is not the case, the negative test result leads automatically to the starter start. Otherwise the starter-free start is activated. If the starter-free start comes about, test unit 35 tests, in a second stage, whether the initiated starter-free start is able to be successfully concluded or whether it is failing. In the first case, a starter-free start is continued, and in the second case it is broken off, and the starter start is automatically initiated. If the starter start is initiated after the first stage of the test, test unit 35 tests in the second stage whether the initiated starter start is able to be successfully concluded, or whether it is failing. In the first case, the starter start is continued, and in the second case, the starter start is broken off by switchover unit 40, and switchover unit 40 switches again automatically to the starter-free start and initiates the latter.

The test for a successful start using the starter-free starting method may be carried out by evaluation of the temperature of engine system 1, such as the oil temperature. In addition or alternatively, the test for a successful start may be made with the aid of the starter-free starting method by evaluation of the engine rotary speed of internal combustion engine 65 of engine system 1. In the case of a starter-free start with the aid of direct start by direct gasoline injection, test unit 35 is also able to carry out the test for a successful start using the starter-free starting method by evaluation of the crankshaft position of engine system 1. For the direct start using direct gasoline injection, according to German Patent Application No. DE 197 43 492, it is required that one of the cylinders of combustion engine 65 is in the working phase. Then, for the direct start, the fuel is injected into the combustion chamber of this cylinder, and the air/fuel mixture forming there is ignited. The evaluation as to whether the appropriate cylinder is in the operating phase takes place on the basis of the crank angle.

The engine's rotary speed may also be ascertained via crank angle sensor 75, namely from the temporal gradient of the measured crank angle.

Correspondingly, for testing for a successful start using the starter, test unit 35 can evaluate the temperature of engine system 1 and/or the engine rotary speed of engine system 1 and/or, in the case of a possible starter-free direct start using direct gasoline injection, also the position of crankshaft 10.

The method according to the present invention is explained below in exemplary form, in the light of a flow chart shown in FIG. 4, direct start using direct gasoline injection based on the first example embodiment as in FIG. 1 being also viewed in exemplary fashion as a starter-free starting method.

After the beginning of the program, test unit 35 tests at a program point 100 whether a start-stop operation is present. For this purpose, test unit 35 is able, for example, to evaluate the speed measurement signal of a vehicle speed sensor not shown in FIG. 3. In this context, if the vehicle speed is below a specified value such as 40 km/h, start-stop operation is detected, and the system branches to a program point 105; otherwise the system exits the program.

At program point 105, test unit 35 induces the shutting down of combustion engine 65, for instance, after test unit 35 has detected an operation of the vehicle brakes by the operation of brake pedal 85. The shutting down of the combustion engine, in this context, may be carried out by test unit 35, for instance, by fading out all cylinders of combustion engine 65 by blocking the fuel supply to all cylinders of combustion engine 65. In addition or alternatively, test unit 35 can terminate the air supply by closing throttle valve 50. In addition or alternatively, test unit 35 can suspend the ignition. The influencing of the three manipulated variables named by test unit 35 is indicated symbolically in FIG. 3. After program point 105, the system branches to a program point 110.

At program point 110, test unit 35 tests whether crankshaft 10 of combustion engine 65 remains standing in a favorable position for direct start using direct gasoline injection, i.e., whether cylinder 95 or one of the cylinders of combustion engine 65 is in the working phase at stillstand of the engine. If so, the system branches to a program point 115, otherwise the system branches to a program point 120. In addition, at program point 110, test unit 35 can optionally test whether the temperature of engine system 1 is undershooting a specified value, such as 100° C. At program point 115, branching takes place, at this additional temperature test, only if the temperature undershoots the specified value, otherwise branching goes to program point 120.

At program point 115, there is a positive test result. In the case of a start request by the driver, test unit 35 detects the operation of accelerator 15. In this case, test unit 35 passes on the positive test result to switchover unit 40. Thereupon, switchover unit 40 induces fuel injector 25 to inject fuel into cylinder 95, which is just now in the working phase, and initiates in this manner the direct start using direct fuel injection. Air supply and ignition are accordingly stopped by test unit 35. Subsequently, the system branches to a program point 125.

At program point 125, test unit 35 tests whether the initiated direct start using direct gasoline injection is running successfully. This is the case if, at a first specified point in time $t_0$ after the beginning of the starting procedure, the then-existing engine rotary speed $nmot_0$ exceeds a specified threshold value. This may be selected to be, for example, 120 U/min (revolutions per minute), if the first point in time is, for instance, 0.075 seconds after the beginning of the starting procedure. Direct start is also successful if, in a specified time span after the beginning of the starting procedure, the gradient with respect to time of the engine rotary speed exceeds a second specified threshold value. This gradient can be ascertained in a simple way by dividing the engine rotary speed $nmot_2$ at a third specified point in time $t_2$ after the beginning of the starting procedure is divided by engine rotary speed $nmot_1$ at a second specified point in time $t_1$ after the beginning of the starting procedure, this quotient having to be greater than the second specified threshold value if the direct start is to be successful. In this context, the second specified point in time $t_1$ follows the first specified point in time $t_0$, and the third specified point in time $t_2$ follows the second specified point in time $t_1$. The second specified threshold value may, for instance, take on a value of 4, the second specified point in time $t_1$ being selected to be, for instance, 0.13 seconds and the third specified point in time $t_2$ being selected to be, for instance, 0.18 seconds. If one of the two conditions described is detected by test unit 35 as satisfied at program point 125, the starter-free direct start is continued and the program is exited, otherwise branching takes place to a program point 130.

At program point 130, test unit 35 tests whether the current engine rotary speed nmot is undershooting a third specified threshold value, such as 150 U/min. If so, the system branches to a program point 135, otherwise the system branches to a program point 140.

At program point 140, the system runs through a wait loop for a specified time interval, such as one of the order of magnitude of a few milliseconds. The program subsequently branches back to program point 130.

At program point 135, test unit 35 transmits a negative test result to switchover unit 40 and induces it to break off the direct start using direct gasoline injection and to initiate a starter start. Subsequently, the program branches to a program point 145.

At program point 145, test unit 35 tests whether the initiated starter start is running successfully. This test can take place in the same manner as at program point 125. If test unit 35 detects a successful starter start, the latter is continued and the program is exited. Otherwise, the program branches to a program point 150.

At program point 150, test unit 35 transmits a negative test result to switchover unit 40 and induces it to break off the starter start and to initiate the starter-free direct start using direct gasoline injection and having the corresponding activation of fuel injector 25 of cylinder 95, which is just in the working phase. Besides that, test unit 35 sets the air supply via throttle valve 50, as well the ignition time via spark plug 60 in a suitable way so as to implement the starter-free direct start using direct gasoline injection. The program subsequently branches back to program point 125.

At program point 120, test unit 35 transmits a negative test result to switchover unit 40, if a start request is detected in test unit 35 based on the operation of accelerator 15, and consequently induces switchover unit 40 to initiate the starter start. The program subsequently branches to program point 145.

Consequently, upon failure of the starter-free starting method, the system is switched over to the starter starting method and vice versa. Depending on whether the start is successful, this switching over may occur several times. Thus a starting coordination is implemented in which, as quickly as possible, the system switches over to the starter start, as soon as it is determined that a starter-free start is not possible or has failed.

In case the starter-free direct start using direct gasoline injection is not successful, the system has to switch over as quickly as possible to starter start, so that a considerable prolonging of the starting time does not occur. At program point 125, by evaluating engine rotary speed nmot, it can be recognized at an early point that the initiated direct start was not successful or will not be successful. The engine's rotary speed nmot is also denoted as n below. In the simplest case, a failure of a direct start using direct gasoline injection is detected in that combustion engine 65 moves only a little after the first injection. This is the case if, at the first specified point in time $t_0$, engine rotary speed $n=nmot_0$ undershoots the first specified threshold value. In this context, the first specified threshold value is selected, for instance, to be about 120 U/min. First specified point in time $t_0$ amounts to approximately 0.075, for example. FIG. 5 shows in exemplary fashion the curve of engine rotary speed n in 1/min plotted against time t in s, the starting procedure beginning at point t=0. At first specified point in time $t_0$, in this context, the rotary speed curve has a first local maximum at $n=nmot_0$, which, at 200 U/min lies above the first specified threshold value, so that, at first specified point in time $t_0$ the direct start using direct gasoline injection is still detected as successful.

If the first specified threshold value is now exceeded at first point in time $t_0$, it may nevertheless be that the acceleration of the engine rotary speed is not sufficient for an engine runup. The earlier this false start is detected, the earlier the starter start can be activated. The criterion for this is the described temporal gradient which should be above the second specified threshold value, so that the direct start using direct gasoline injection is able to be successful. The second specified threshold value may be selected, in this context, to be about 4. In FIG. 5, this gradient $nmot_2/nmot_1$ calculated in a simplified manner as a quotient amounts to about a value of 5, and thereby lies above the second specified threshold value. In this context, at third specified point in time $t_2$, the rotary speed curve has a second local maximum having the value $n=nmot_2$, and at the second specified point in time $t_1$ the rotary speed curve, at $n=nmot_1$ has a first local minimum.

As shown in FIG. 5, the engine runup develops successfully at least up to point in time t=0.3 s, and approaches the starting rotary speed that is to be attained, of 1000 U/min.

Before the starter can be operated, however, engine rotary speed n must have fallen again below the third specified threshold value, which is tested for at program point 130. That means that, in the case of a preceding direct start attempt using direct gasoline injection, which has led to an increase in engine rotary speed n, first of all one has to wait until engine rotary speed n has dropped off again below the third specified threshold value. In this context, combustion engine 65 may optionally be additionally braked, such as by activating throttle valve 50, so as to reduce the air supply, or by suitable activation of starter generator 30, if there is one. In this way, the starter start may be initiated as quickly as possible after the failure of the starter-free start was detected.

If the starter start is no longer possible, for example, because of a discharged battery or lacking electrical-system voltage, one or more additional starting attempts using starter-free start may also still be made.

Figure 4:
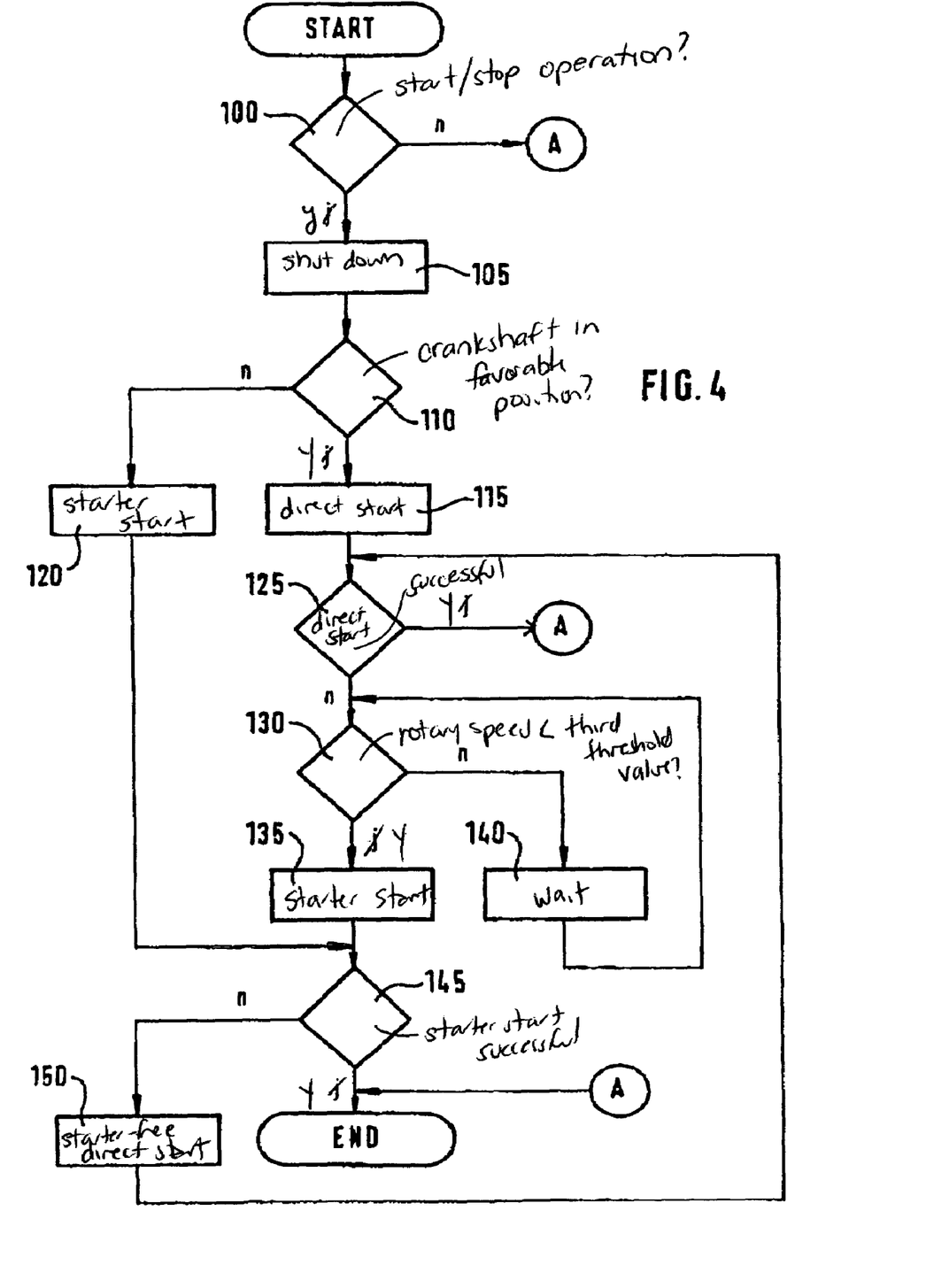
FIG. 4 shows a flow chart for a first example flow of a method according to the present invention.
Figure 5:
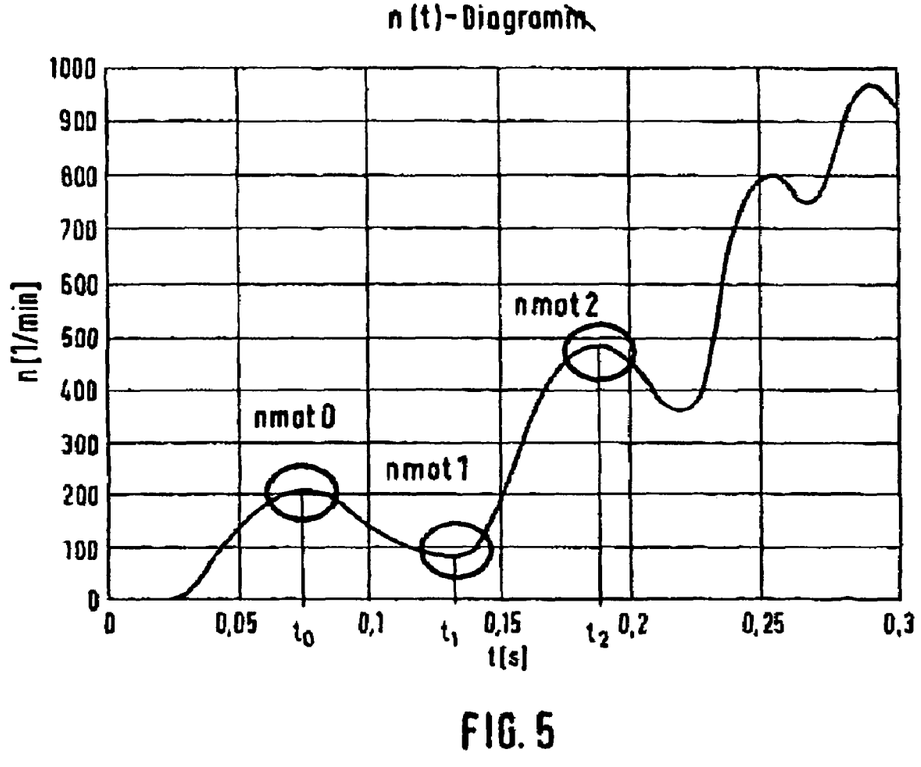
FIG. 5 shows a rotary speed-time graph for a first example starting procedure of an internal combustion engine.

The method according to the present invention was described in exemplary fashion, in the light of the flow chart according to FIG. 4, for the case of starter-free direct starts using direct fuel injection. The sequence is corresponding if the starter-free start is used while using starter generator 30, based on the example embodiment according to FIG. 2. In this case, the starter-free start is then not initiated by corresponding activation of fuel injector 25, throttle valve 50 and spark plug 60, but rather by the corresponding activation of starter generator 30 by switchover unit 40. If starter generator 30 is used for the starter-free start, a direct fuel injection is also no longer required, so that fuel injector 25 could also be situated in this case in intake manifold 55, in order to effect an intake manifold injection.

Figure 6:
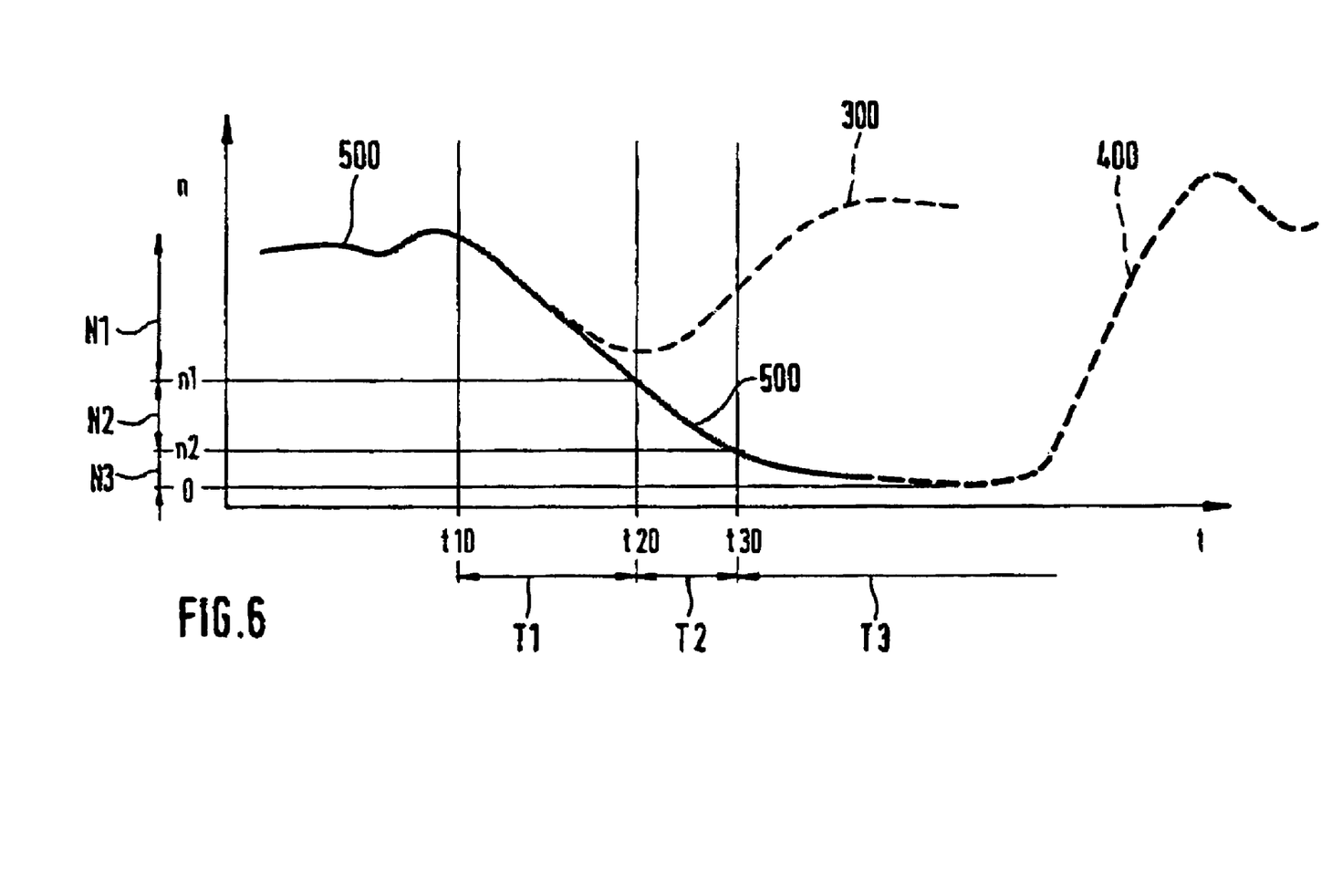
FIG. 6 shows a rotary speed-time graph for a second example starting procedure of an internal combustion engine.
Figure 7:
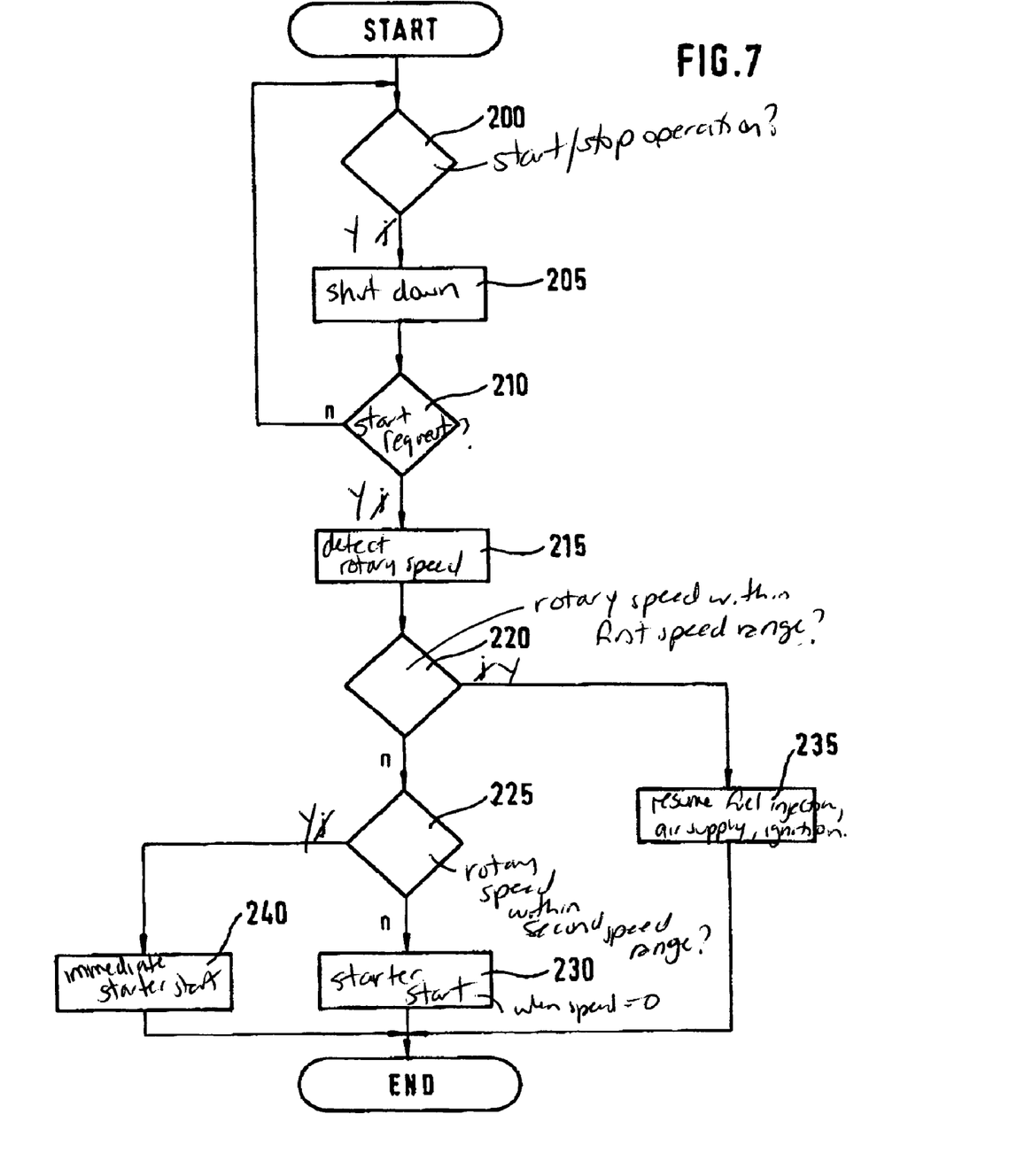
FIG. 7 shows a flow chart for a second example flow of the method according to the present invention.

In the light of FIGS. 6 and 7, another example embodiment of the present invention is described below.

In the case of this additional exemplary embodiment, a starting coordination may be ensured in response to a renewed start request by the driver after shutting down of the engine system, but still during the running down of the engine system, with the aim of a restart of combustion engine 65 that is as quick as possible. In this context, depending on the current engine rotary speed, that is, an actual value of the engine rotary speed, for the restart during such an operating phase of the engine running, either the lighting of combustion engine 65 is taken up again by activating the fuel supply, the air supply and the ignition or starter 5 is activated.

In this context, an additional rotary speed/time diagram is shown in FIG. 6. The temporal curve of the actual value of the engine rotary speed is denoted by 500. At a first point in time t10, combustion engine 65 is shut down, for instance, after test unit 35 has detected operation of the vehicle brake by the operation of brake pedal 85. Shutting down the combustion engine, in this context, may be carried out by test unit 35, for instance by fading out (stopping) all the cylinders of combustion engine 65 by blocking the fuel supply to all cylinders of combustion engine 65. In addition or alternatively, test unit 35 is able to end the air supply by closing throttle valve 50. In addition or alternatively, test unit 35 is able to suspend the ignition. The influencing of the three manipulated variables named by test unit 35 is indicated symbolically in FIG. 3. By shutting down combustion engine 65, a reduction in actual value 500 of the engine rotary speed comes about beginning at point in time t10, based on the initiated engine running down. However, up to a second point in time t20 following first point in time t10, actual value 500 of the engine rotary speed runs above a first rotary speed threshold n1. The rotary speed range of the engine rotary speeds above first rotary speed threshold n1 is denoted in FIG. 6 by N1, and represents a first rotary speed range. Between first point in time t10 and second point in time t20 a first time range T1 is produced. Now, during first time range T1, after the shutting down of combustion engine 65, but still during the running down of combustion engine 65, if a start request of the driver is recognized by test unit 35 by the detection of an operation of accelerator 15, the engine rotary speed still lies in first rotary speed range N1. In this context, first rotary speed range N1 is specified in such a way and stored in test unit 35 that, at an engine rotary speed in first rotary speed range N1, a restart of combustion engine 65 without starter 5 is possible. For this purpose, first rotary speed N1 and first rotary speed threshold n1, which defines this first rotary speed range N1, is, for example, applied suitably on a test stand and specified. A start request of the driver in first time range T1 then leads to a restart of combustion engine 65 in that, immediately upon recognition of the start request, fuel injection, air supply and ignition are begun again. Without this measure, one would have to wait until combustion engine 65 has run down and the engine's rotary speed has reached zero. This would lead to a considerable time delay. First rotary speed range N1 can, for example, be specified in such a way that it includes engine rotary speeds greater than or equal to 200 revolutions per minute. First rotary speed threshold n1 would, in this case, amount to 200 U/min. However, because of the restart carried out in the manner described, during first time range T1, the actual value of the engine's rotary speed is raised again early, still during first time range T1, as indicated by the dashed curve in FIG. 6 which is characterized by reference numeral 300.

If there is no start request by the driver in first time range T1, actual value 500 of the engine's rotary speed falls below first rotary speed threshold n1. At a third point in time t30 following second point in time t20, it (actual value 500) reaches a second rotary speed threshold n2, which is smaller than first rotary speed threshold n1. First rotary speed threshold n1 and second rotary speed threshold n2 bound a second rotary speed range N2. Second point in time t20 and third point in time t30 bound a second time range T2. Now, during second time range T2, after the shutting down of combustion engine 65, but still during the running down of combustion engine 65, if a start request of the driver is recognized by test unit 35 by the detection of an operation of accelerator 15, the engine rotary speed still lies in second rotary speed range N2. In this context, second rotary speed range N2 is specified in such a way and stored in test unit 35 that, at an engine rotary speed in second rotary speed range N2, an immediate restart of combustion engine 65 using starter 5 is possible. For this, second rotary speed range N2 and second rotary speed threshold n2, which bound this second rotary speed range N2 at the bottom to lower rotary speeds, are, for instance, suitably applied on a test stand and specified. A start request of the driver in second time range T2 then leads to a restart of combustion engine 65 in that starter 5 is immediately activated upon recognition of the start request. Without this measure one would have to wait until combustion engine 65 has run down and the engine's rotary speed has reached zero. This would lead to a considerable time delay.

Second rotary speed range N2 can, for example, be specified in such a way that it includes engine rotary speeds less than 200 revolutions per minute and greater than or equal to 50 U/min. Second rotary speed threshold n2 would, in this case, amount to 50 U/min. However, on account of the restart in the manner described, during second time range T2 the actual value of the engine's rotary speed is raised again early, still during second time range T2.

If there is also no start request by the driver in second time range T2, actual value 500 of the engine's rotary speed falls below second rotary speed threshold n2. The rotary speeds below second rotary speed threshold n2 for a third rotary speed range N3. In the numerical example described here, the latter consequently includes engine rotary speeds less than 50 U/min and greater than or equal to zero. From third point in time t30 to a point in time not characterized in FIG. 6, at which combustion engine 65 would reach engine rotary speed zero, a third time range T3 is formed.

Now, during third time range T3, after the shutting down of combustion engine 65, but still during the engine's running down of combustion engine 65, if a start request of the driver is recognized by test unit 35 by the detection of an operation of accelerator 15, the engine rotary speed lies in second rotary speed range N3. A start request of the driver in third time range T3 then leads to a restart of combustion engine 65, in that the engine running down of combustion engine 65, and thus the reaching of engine rotary speed zero, is awaited, and when engine rotary speed zero is attained, the starter start is initiated by activating starter 5. On account of the restart carried out in the manner described during third time range T3, the actual value of the engine's rotary speed is consequently raised again only after attaining engine rotary speed zero, as is characterized by the dashed curve of the actual value of the engine rotary speed having reference numeral 400 in FIG. 6.

In the light of the flow chart in FIG. 7, the sequence of the method according to the present invention is once more shown and explained in exemplary fashion, according to the additional specific example described.

Following the start of the program, test unit 35 checks at a program point 200 whether a start-stop operation is present. For this purpose, test unit 35 may, for example, evaluate the speed measuring signal of a vehicle speed sensor not shown in FIG. 3. In this context, if the vehicle speed is less than a specified value of, for instance, 40 km/h, start-stop operation is recognized, and branching takes place to a program point 205, and otherwise the program is exited.

At program point 205, test unit 35 induces the shutting down of combustion engine 65, for instance, after test unit 35 has detected an operation of the vehicle brake by the operation of brake pedal 85. Shutting down the internal combustion engine, in this context, may be carried out by test unit 35, for instance by fading out all the cylinders of combustion engine 65, by blocking the fuel supply to all cylinders of combustion engine 65. In addition or alternatively, test unit 35 is able to terminate the air supply by closing throttle valve 50. In addition or alternatively, test unit 35 is able to suspend the ignition. The influencing of the three manipulated variables named by test unit 35 is indicated symbolically in FIG. 3. After program point 205, the program branches to a program point 210.

At program point 210, test unit 35 tests whether a start request of the driver is present. Such a start request is detected by test unit 35 if test unit 35 detects the operation of accelerator 15. If this is the case, that is, such a start request is present, the program branches to a program point 215, and otherwise the program branches back to a program point 200.

At program point 215, test unit 35 ascertains the actual value of the engine's rotary speed, by evaluating the measuring signal received from crank angle sensor 75. Subsequently, the program branches to a program point 220.

At program point 220, test unit 35 tests whether the actual value of the engine's rotary speed lies within first rotary speed range N1. If this is the case, the program branches to program point 235, otherwise the program branches to a program point 225.

At program point 235, test unit 35 induces an immediate resumption of the injection of fuel, air supply and ignition. Subsequently, the program is exited.

At program point 225, test unit 35 tests whether the actual value of the engine's rotary speed lies within second rotary speed range N2. If this is the case, the program branches to a program point 240, otherwise the program branches to a program point 230.

At program point 240, test unit 35 induces an immediate activation of starter 5, for the immediate carrying out of a starter start. The program is subsequently exited.

At program point 230, test unit 35 induces an activation of starter 5, for carrying out a starter start, as soon as the actual value of the engine's rotary speed has reached the value zero. The program is subsequently exited.

If, in the preceding text, the start request of the driver is mentioned, what is involved, in this context, is, for example, a torque request to the internal combustion engine after shutting down combustion engine 65, given rise to by operation of the accelerator on the part of the driver. In this context it may be provided that the start request is detected only when the gradient of the operation of accelerator 15, or the gradient of the torque request connected with it, is greater than a specified threshold value, which may, for instance, be applied on a test stand.

What is claimed is:

1. A method for starting an engine system of a vehicle, comprising:
    in response to a start request, performing a starter-free starting method;
    testing whether the starter-free starting method leads to a successful start of the engine system; and
    if the testing yields a negative result, automatically starting the engine system using a starter,
    wherein the testing for the successful start is conducted by evaluating at least one of a temperature of the engine system and a position of a crankshaft of the engine system so as to determine whether a cylinder of the engine system is in a working phase when the engine system is at a standstill.

2. The method as recited in claim 1, wherein the testing for the successful start is conducted by evaluating a rotary speed of the engine system.

3. The method as recited in claim 1, wherein the starter-free starting method is a pulse starting method.

4. The method as recited in claim 1, wherein the starter-free starting method is a direct start method.

5. The method as recited in claim 4, wherein the engine system is started directly in the direct start method using direct gasoline injection.

6. The method as recited in claim 1, further comprising:
if the automatic starter start fails, automatically starting the engine system with the aid of the starter-free starting method.

7. The method as recited in claim 1, wherein the start request is detected upon operation of an operating element when the engine system is shut down.

8. The method as recited in claim 7, wherein the operating element is an accelerator.

9. The method as recited in claim 2, further comprising:
if the start request is after a shutting down of the engine system, testing whether the rotary speed of the engine system is in a first specified range; and
if the rotary speed is in the first specified range, starting the engine system in a starter-free manner.

10. A method for starting an engine system of a vehicle, comprising:
in response to a start request, performing a starter-free starting method;
testing whether the starter-free starting method leads to a successful start of the engine system, wherein the testing for the successful start is conducted by evaluating a rotary speed of the engine system;
if the engine system is not successfully started using the starter-free starting method, automatically starting the engine system using a starter;
if the start request is after a shutting down of the engine system, testing whether the rotary speed of the engine system is in a first specified range;
if the rotary speed is in the first specified range, starting the engine system in a
starter-free manner; and
if the rotary speed of the engine system is in a second specified range, which is below the first specified range, starting the engine system by an immediate intervention of the starter.

11. The method as recited in claim 10, further comprising:
if the rotary speed of the engine system is in a third range, which is below the second specified range, starting the engine system by the intervention of the starter, after a running down of the internal combustion engine.

12. A device for starting an engine system of a vehicle, comprising:
an arrangement configured to perform a starter-free start of the engine system in response to a start request;
a testing arrangement configured to test whether the starter-free start leads to a successful start of the engine system; and
a switchover arrangement configured to automatically start the engine system using a starter if the test yields a negative result,
wherein the testing for the successful start is conducted by evaluating at least one of a temperature of the engine system and a position of a crankshaft of the engine system so as to determine whether a cylinder of the engine system is in a working phase when the engine system is at a standstill.

13. A method for starting an engine system of a vehicle, comprising:
in response to a start request, performing a starter-free starting method;
testing whether the starter-free starting method leads to a successful start of the engine system;
if the engine system is not successfully started using the starter-free starting method, automatically starting the engine system using a starter, wherein the testing for the successful start is conducted by evaluating at least one of an oil temperature of the engine system and a position of a crankshaft of the engine system; and
in response to a start request after the engine system has been switched off and while the engine system is shutting down, starting the engine system using one of the starter-free starter method and the starter depending on a speed of the engine system.

14. A method for starting an engine system of a vehicle, comprising:
in response to a start request after the engine system has been switched off and while the engine system is running down, starting the engine system using one of a starter-free starting method and a starter depending on a speed of the engine system.

15. The method as recited in claim 14, wherein:
in response to the start request, performing the starter-free starting method;
testing whether the starter-free starting method leads to a successful start of the engine system; and
if the engine system is not successfully started using the starter-free starting method, automatically starting the engine system using the starter.

16. The method as recited in claim 15, wherein the testing for the successful start is conducted by evaluating a speed of the engine system.

17. The method as recited in claim 14, further comprising:
if an induced starter start fails, automatically starting the engine system using the starter-free starting method.

18. The method as recited in claim 14, wherein the start request is detected upon operation of an operating element when the engine system is shut down, the operating element being an accelerator pedal.

19. A device for starting an engine system of a vehicle, comprising:
a testing arrangement configured to ascertain a speed of the engine system in response to a start request after the engine system is switched off and while the engine system is running down; and
a switchover arrangement configured to start the engine system using one of a starter-free method and a starter, depending on the ascertained speed of the engine system.

20. A device for starting an engine system of a vehicle, comprising:
a testing arrangement configured to test whether an induced-starter start is failing; and
a switchover arrangement configured to start the engine system using a starter-free method if the induced-starter start fails.

21. The method of claim 1, wherein the temperature of the engine system is obtained via an oil temperature.

22. A method for starting an engine system of a vehicle, comprising:
testing whether an induced-starter start is failing; and
starting the engine system using a starter-free method if the induced-starter start fails.

* * * * *